INVENTORS
HENDRIK JAN MAAT
JOHANNES EBREGT

FOR: pH = 8.2 and T = 80°C.

FOR: pH = 8.2 and T = 80°C.

United States Patent Office 3,445,189
Patented May 20, 1969

3,445,189
PROCESS FOR THE PRODUCTION OF A FINELY DIVIDED, NON-GELATINOUS SILICIC ACID ESPECIALLY SUITABLE AS A FILLER FOR NATURAL AND SYNTHETIC RUBBER AND OTHER ELASTOMERS
Hendrik J. Maat, Diemen, and Johannes Ebregt, Beemster, Netherlands, assignors to Koninklijke Zwavelzuurfabrieken v/h Ketjen N.V., a limited-liability company of the Netherlands
Filed Mar. 3, 1966, Ser. No. 531,414
Claims priority, application Netherlands, Mar. 5, 1965, 6502791
Int. Cl. C01b 33/00
U.S. Cl. 23—182
10 Claims

ABSTRACT OF THE DISCLOSURE

In the process for producing finely divided silicic acid by simultaneously adding solutions of an alkali silicate and a strong mineral acid to water at a temperature between 70° C. and 90° C., then acidifying the reaction mixture and then separating, washing and drying the silicic acid formed: a pH of 7 to 9 is maintained during the additions of the alkali silicate and strong mineral acid solutions to the water, and the addition of such solutions to the water is continued until the concentration of $SiO_2$ in the reaction mixture has attained a value in the range between 2.5% and 5.0%, by weight, and, as a function of the pH and temperature of the reaction mixture, corresponds to a point within FIG. 7.

---

Figure 1:
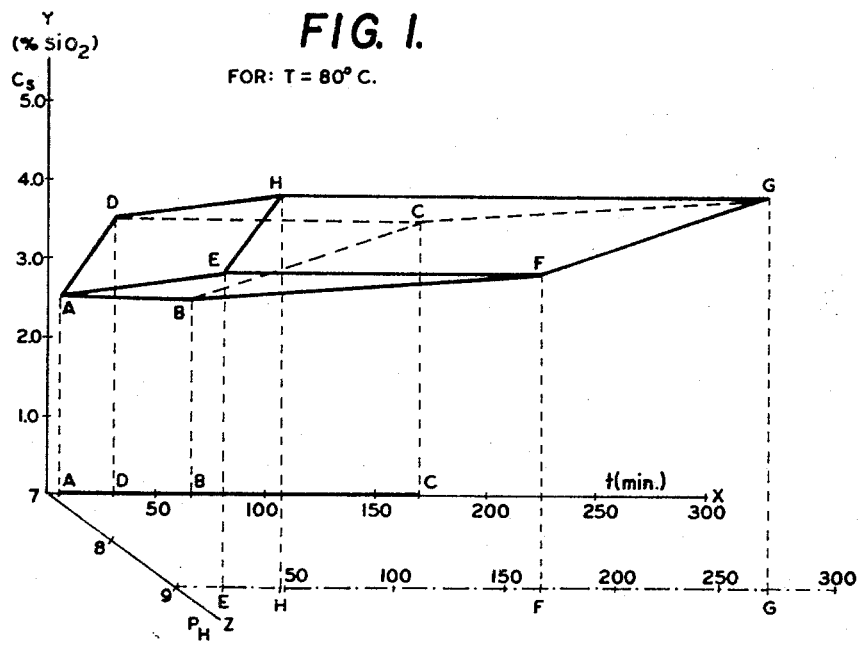

This invention relates to a process for the production of non-gelatinous silicic acid in finely divided form, and particularly to an improved process of the type in which alkali silicate solutions and strong mineral acids are introduced simultaneously into an aqueous liquid to form a reaction mixture, the reaction mixture is acidified after completion of the addition, and the silicic acid formed is separated, washed and dried.

Such methods of production are known, for example, in Belgian Patent No. 629,129, in which the solutions of alkali silicate and acid are fed simultaneously into an alkaline aqueous solution, the viscosity of the aqueous medium is maintained low during at least 30% of the total precipitation period, and the feeding of the reaction components is interrupted only when the viscosity, after passing through a maximum, has dropped to a value which is less than double the initial viscosity. This is achieved also by working at a temperature between 80° C. and 90° C. and a pH between 10 and 12, preferably at about 10. The addition of both solutions is continued until the content of $SiO_2$ is between 50 and 150 g./l.

It has been found that when the $SiO_2$ is to be used for various purposes, for example, as a filler for natural and synthetic rubber and other elastomers, the surface area of the silicic acid and also the oil absorption are of vital importance. The surface area of the silicic acid is determined by means of the nitrogen absorption method of Brunauer, Emmett and Teller (J.A.C.S. 60, 309, 1938).

The oil absorption, which is a measure of the porosity, is the quantity in cc. of linseed oil per g. of silicic acid just sufficient to be able to form a small ball of the silicic acid (modified Gardner-Coleman oil absorption test). It has been found that in the production of silicic acid the surface area and oil absorption do not vary in parallel, but that a kind of satisfactory comprise must be attained between surface area and oil absorption.

It has been found that such a satisfactory compromise can be realized, and this is the essence of the present invention, if water is taken as the aqueous liquid, during the simultaneous introduction of the alkali silicate and acid solutions into the water at a temperature in the range of 70° C. to 90° C. the pH is maintained in the range of 7–9, and the introduction of the alkali silicate and acid solutions is continued until a $SiO_2$ concentration of 2.5–5% in the reaction mixture has been reached.

Extensive investigations have further indicated that, if a finely divided silicic acid is to have good reinforcement properties for rubber, it must have a surface of 100 to 250 m.²/g. and an oil absorption of more than 2 cc./g.

During simultaneous proportioning or introduction of the alkali silicate and acid solutions, the oil absorption for selected values of pH, temperature, and concentration depends on the proportioning time, and is found to initially increase with time, pass through a maximum, and then decrease as the proportioning time is extended. To reach the desired compromise between surface area and oil absorption, the proportioning should be ended before the maximum oil absorption has been reached.

Although it has been proposed in German Patent No. 946,433 to slowly react solutions of alkali silicate and acid with intensive agitation particularly at temperatures between 80° C. and 100° C. while the pH is maintained at a value of 6–8 during the entire precipitation period, nothing whatever is said about the duration of the proportioning or the final concentration to be achieved. In this process, there is no acidification at the end of the reaction, so that the sodium among other things, cannot be washed out completely from the end product. Although considerable amounts of sodium may be tolerated in silicic acid for pharmaceutical purposes, such material is not suitable as a filler for natural and synthetic rubber and other elastomers.

In German Patent No. 966,985, Example II is a process in which alkali silicate and acid solutions are simultaneously proportioned or introduced, at a temperature of 70° C. and a pH of 5, into a 7.5-percentual soduim chloride solution. Here apparently there is acidification to a low pH after completion of the reaction. Examples I and II operate at room temperature, while, in Example III, no temperature at all is given and evidently was not considered to be important. Further, in Examples I and IV a pH of 8.5 is adopted, while in Example II no pH range is given and it is only mentioned that ammonia is liberated, from which it may be concluded that the reaction takes place in the alkaline range. In all examples it is emphasized that an indifferent electrolyte must always be present in a concentration of at least 1% at the beginning of the precipitation. he proportioning rate, and hence also the proportioning time, has, according to German Patent No. 966,985, no appreciable effect on the quality of the product obtained, which is quite contrary to what is the case in the process according to the present invention.

In the process according to the present invention, any soluble silicate, for example, sodium or potassium silicate, may be used. However, for practical reasons, dilute waterglass with a $SiO_2/Na_2O$ ratio of 3.3/1 is preferred. Likewise any strong mineral acid may be used, but sulfuric acid is preferred.

It is clear that in the course of the process the silicic acid concentration of the mixture gradually increases. After a certain time, jellying occurs, and thereafter a finely divided precipitate forms. The $SiO_2$ concentration ($C_s$) in percent, by weight, in the reaction mixture at time $t$ (in minutes) is expressed by the formula:

$$C_s = \frac{t}{Pt+Q}$$

where: P is the weight increase in grams of the reaction mixture per minute over 100 times the number of grams of $SiO_2$ proportioned per minute; and Q is the quantity (V) of water in grams over 100 times the number of grams of $SiO_2$ proportioned per minute.

Q is thus a measure of the rate of the $SiO_2$ concentration build-up. Small values of Q correspond to a high initial rate of $SiO_2$ concentration build-up. P is a measure of the dilution of acid and waterglass in the reaction mixture.

Further, at constant pH the following formula applies:

$$\frac{C_z \times F_z}{C_w \times F_w} = \text{Constant}$$

where:

$C_z$ = the percentage by weight of (for example) $H_2SO_4$ in the acid, $F_z$ = the added quantity of acid in grams per minute (feed rate), $C_w$ = the percentage by weight of $SiO_2$ in the alkali silicate solution, $F_w$ = the added quantity of alkali silicate solution in grams per minute (feed rate).

P and Q can also be expressed as follows:

$$P = \frac{F_w + F_z}{C_w \times F_w} \quad Q = \frac{V}{C_w \times F_w}$$

With the aid of the five quantities, pH, T, P, Q and $t$, the process can be described exactly.

There will now be given a simpler formulation, which is more directly connected with the range in which one works.

It has been found that, in the pH range 7-9 at a certain temperature, there belongs to each pH a first approximation of an optimum range for the final $SiO_2$ concentration ($C_s$) at which the desired compromise for the resulting finely divided silicic acid is attained. For 80° C. these values are:

at pH 7: $C_s = 2.5-3.5\%$
at pH 8: $C_s = 3.25-4.25\%$
at pH 9: $C_s = 4.0-5.0\%$

This implies that for selected values of P and Q at a certain temperature the proportioning time must lie between the times which, according to the formula $$C_s = \frac{t}{Pt+Q}$$

coincide with extreme values for $C_s$ at a certain pH.

This is true only within certain limits of the values for P and Q. From the definitions of P and Q it follows that these quantities depend on V, $C_w$, $F_w$ and $F_z$.

In practice, one usually works with waterglass solutions having a $C_w$ of 6-27% and with moderately dilute sulfuric acid solutions having a $C_z$ of 5-25%. When using too dilute a waterglass solution, the desired final $SiO_2$ concentration cannot be attained. Starting with waterglass and acid solutions of a certain concentration, one can then adjust to the desired values for P and Q by means of the feed rate $F_w$ and $F_z$.

The process according to the present invention is preferably carried out at values of P between 0.05 and 0.25 and values of Q between 2 and 20. For each temperature there can be defined a three-dimensional area in the orthotomic coordinate system $X$ = time $t$, $Y = C_s$, $Z$ = pH, and within which the end point of the proportioning must fall in order to obtain finely divided silicic acids with good reinforcement properties for rubber. Such three-dimensional area for a temperature of 80° C. is shown on FIG. 1 and the projections of the area on the three orthogonal planes are shown on FIG. 2. The optimum area herein is expressed by the polyhedron defined by the points A B C D E F G H having the following coordinates:

|   | $t$ (minutes) | Y $C_s$, percent | Z pH |
|---|---|---|---|
| A | 6 | 2.5 | 7 |
| B | 66 | 2.5 | 7 |
| C | 170 | 3.5 | 7 |
| D | 32 | 3.5 | 7 |
| E | 22 | 4.0 | 9 |
| F | 166 | 4.0 | 9 |
| G | 270 | 5.0 | 9 |
| H | 48 | 5.0 | 9 |

The area is limited by two planes of constant pH, to wit, plane A B C D at pH=7 and plane E F G H at pH=9, respectively; by two planes A B F E and D C G H, in which, at a pH from 7 to 9, $C_s$ varies from 2.5 to 4% and from 3.5 to 5%, respectively, and by two planes A D H E and B C G F, the latter of which indicates a limitation for the $SiO_2$ concentration build-up rate.

As has been mentioned, the above described area is valid only at a constant temperature of 80° C. but it is also possible to prepare good, finely divided silicic acids at other temperatures between 70° C. and 90° C. This is illustrated by FIGS. 3a and 3b.

Figure 3A:
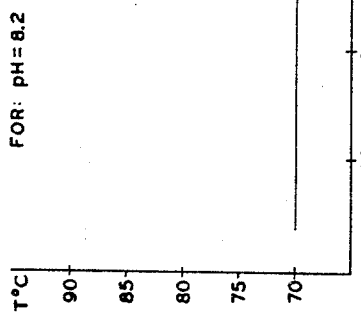

In FIG. 3a there is indicated the area I' J' K' L' within which, at pH=8.2 and at temperatures T between 70° C. and 90° C., the final $SiO_2$ concentration $C_s$ (in percent) in the reaction mixture must lie in the process according to the invention.

Figure 3B:
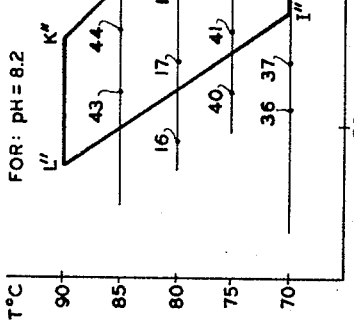

In FIG. 3b there is indicated the area I" J" K" L" within which, at the same pH as in FIG. 3a and at temperatures T between 70° C. and 90° C. the proportioning time $t$ in minutes must lie in the process according to the invention.

It is seen from FIGS. 3a and 3b that, at higher temperatures, good silicic acids are obtained at a lower final $SiO_2$ concentration and at shorter proportioning times. At lower temperatures, of course, the reverse applies.

Figure 2:
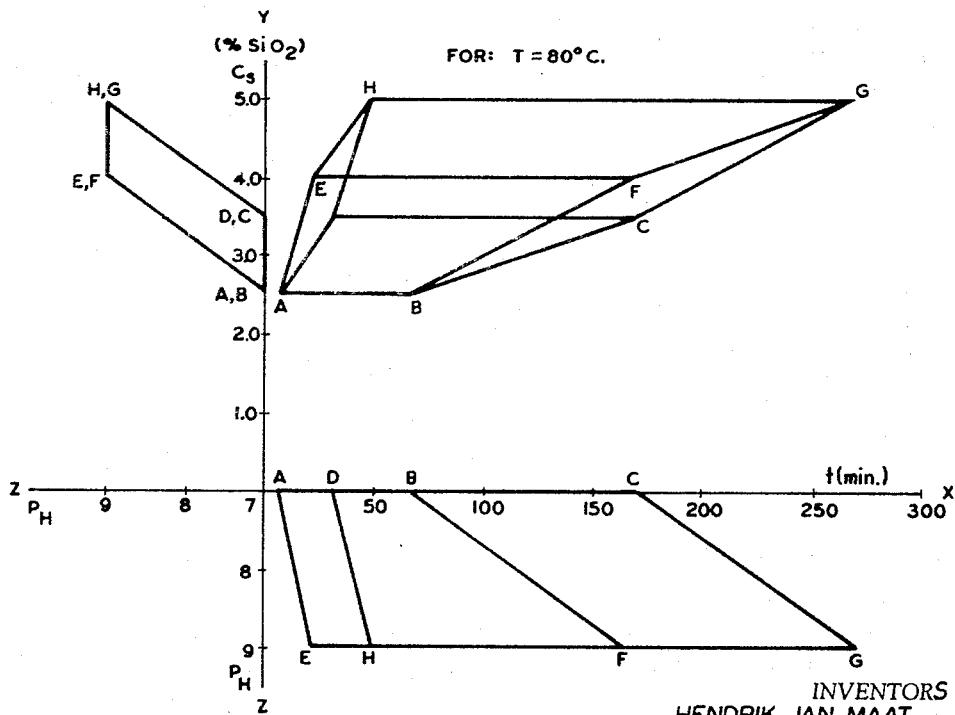

From FIGS. 1 through 3b it is seen that the optimum area A B C D E F G H indicated in FIG. 1 for 80° C., shifts at higher temperatures toward lower final $SiO_2$ concentration and shorter proportioning times, while the reverse is true at lower temperatures. In practice, however, it is favorable to maintain a temperature of 80° C.

Figure 7:
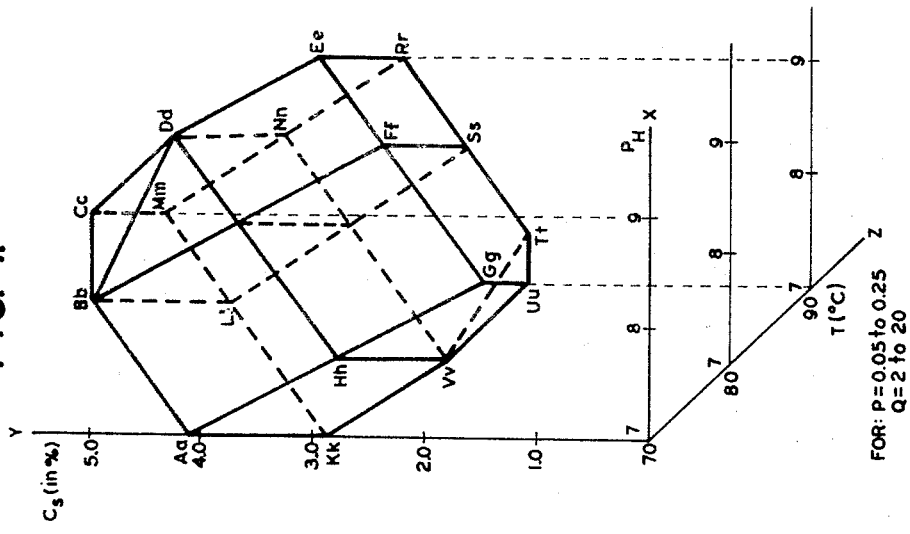

For further illustration there is shown on FIG. 7 the $C_s$ range according to the process embodying the invention as a function of pH and temperature. The coordinates of the points defining the octahedron shown on FIG. 7 are:

|       | X (pH) | Y (Cj) | Z (T) |
|-------|--------|--------|-------|
| Aa    | 7      | 4.1    | 70    |
| Bb    | 8.2    | 5      | 70    |
| Cc    | 9      | 5      | 70    |
| Dd    | 9      | 5      | 80    |
| Ee    | 9      | 4.4    | 90    |
| Gg    | 7      | 2.9    | 90    |
| Kk    | 7      | 2.85   | 70    |
| Mm    | 9      | 4.35   | 70    |
| Rr    | 9      | 3.65   | 90    |
| Tt    | 7.47   | 2.5    | 90    |
| Uu    | 7      | 2.5    | 90    |
| Vv    | 7      | 2.5    | 80    |

The octahedron is limited by the plane B*b* C*c* D*d*, wherein $C_s=5\%$, the plane T*t* U*u* V*v*, where in $C_s=2.5\%$, the plane A*a* G*g* U*u* V*v* K*k*, wherein the pH=7, the plane C*c* D*d* E*e* R*r* N*n* M*m*, wherein the pH=9, the plane A*a* B*b* C*c* M*m* L*l* K*k*, wherein the temperature is 70° C., the plane G*g* F*f* E*e* R*r* S*s* T*t* U*u*, wherein the temperature is 90° C., and two more planes which are fully determined by the joints defining the six previously identified planes.

Figure 4:
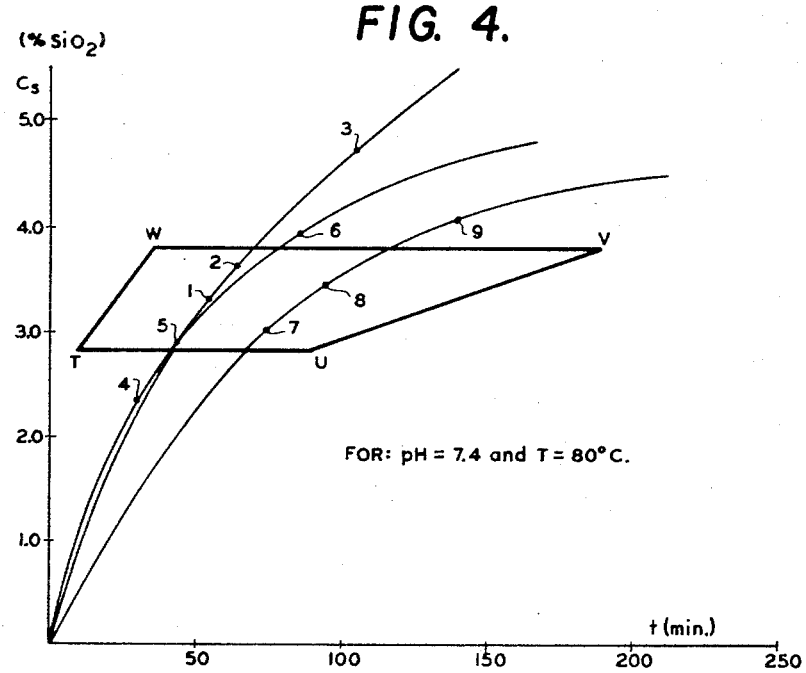
Figure 5A:
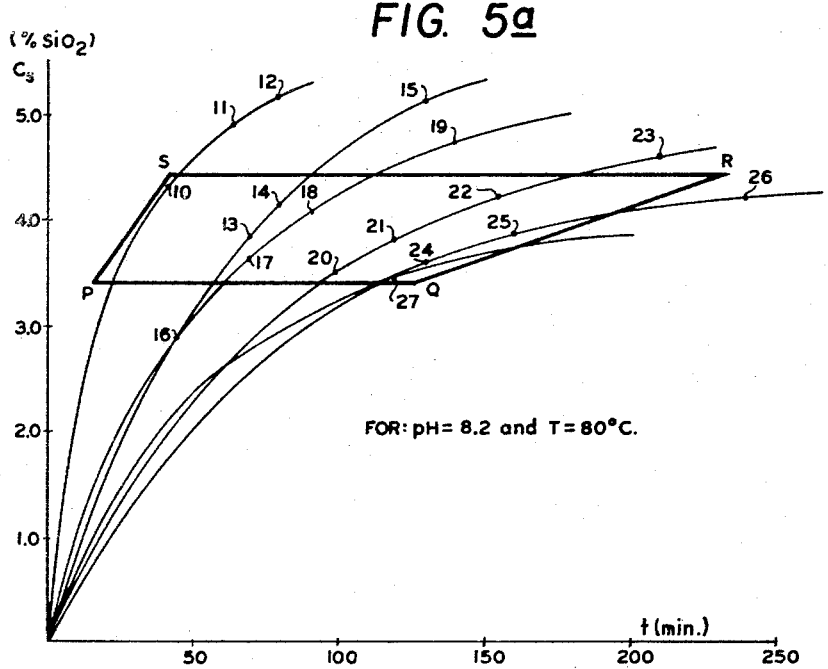
Figure 5B:
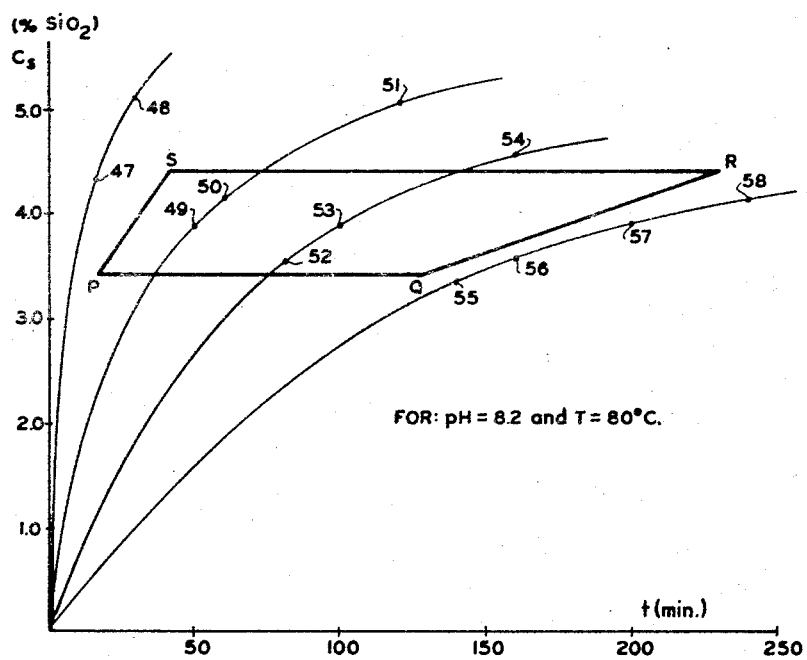

FIG. 4 is a cross-section of the polyhedron of FIG. 1 at pH=7.4, and the area T U V W on FIG. 4 is the area of good silicic acids. FIGS. 5a and 5b are both cross sections of FIG. 1 at the pH=8.2. The area P Q R S on FIGS. 5a and 5b is the area of good silicic acids. One works preferably in this area.

Figure 6:
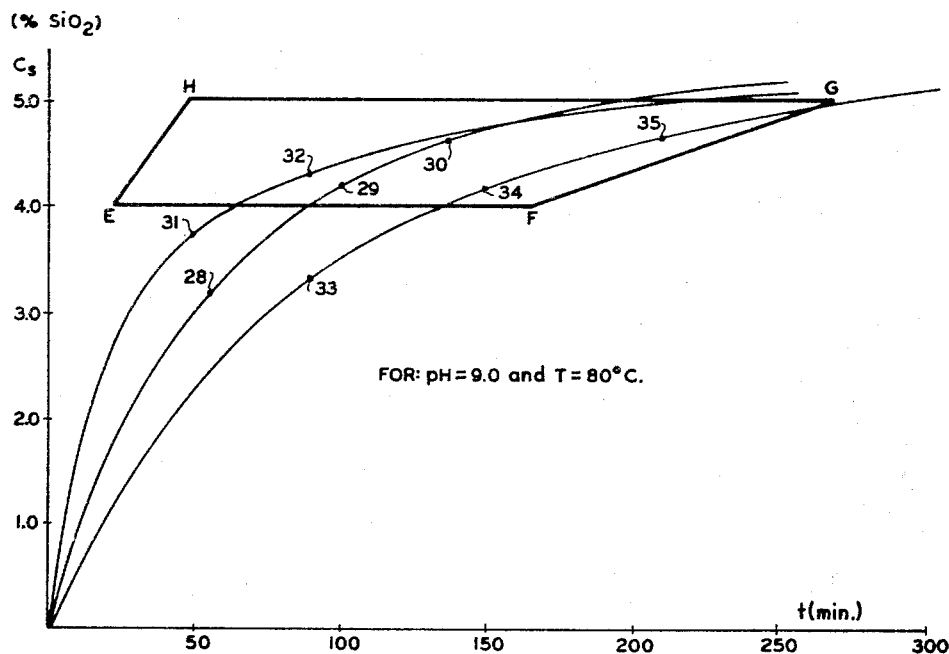

FIG. 6 is a cross section of FIG. 1 at the pH=9.0. The area E H G H is the area of good silicic acids.

What this amounts to is that, according to the process of the present invention, at a certain pH in the range from 7 to 9, at a certain temperature in the range from 70 to 90° C., a P in the range from 0.05 to 0.25, and a Q in the range of 2 to 20, the proportioning time falls within a certain range which, at 80° C., is between 6 and 270 minutes. At this time, more than 95% of the silicic acid is precipitated. Subsequently the pH of the reaction mixture is reduced, for example, with sulfuric acid, to a value lower than 4. This treatment is necessary to fix the desired final surface of the silicic acid. It is essential that this acidification proceed rather quickly. This rapid acidification can be effected, for example, by adding acid, after termination of the simultaneous proportioning, at a much greater speed than during the simultaneous proportioning, and by intensive agitation. Another method of effecting rapid acidification consists in letting the reaction mixture as a whole run out of the reacton vessel into a boiler containing the quantity of acid required for the acidification and having means for effecting intensive agitation. Lastly, the silicic acid is filtered off and washed with sufficient water, for example until the $Na_2O$ content is less than 1%.

The washed filter cake is dried on plates in a drying cabinet at 140° C. for 10 to 20 hours, or in an atomization dryer. In this way finely divided silicic acid having a surface area of 100–250 m.²/g. and an oil absorption of over 2.0 cc./g. is obtained.

This silicic acid can be used excellently as a reinforcing filter for synthetic and natural rubbers, and is particularly suitable as a filler for so-called transparent rubbers.

For good rubber properties the following characteristics are adhered to:

| | |
|---|---|
| Mooney plasticity (non-vulcanized mixture) | (ASTM–D 1646–62)– 100 to 140. |
| Scorch time, minutes (non-vulcanized mixture) | (ASTM–D 1646–62) 4±0.2. |
| Hardness, ° Shore | (ASTM–D 676–59T) >70. |
| Modulus 300, kg./cm.² | (ASTM–D 412–62T) >30. |
| Drawing strength, kg./cm.² | (ASTM–D 412–62T) >200. |
| Elongation at rupture, percent | (ASTM–D 412–62T) >550. |
| Tensile strength, kg./cm.² | (NEN–5603)>45. |
| Wear, mm.³ | (DIN–53516)<180. |
| Transparence | Visual good. |

The silicic acid according to the invention can further be used advantageously as a vehicle for insecticides and aromatics, as an anticaking agent, as additive to asphalt and other bituminous materials for the improvement of their mechanical properties, as a thickening agent and as a thixotropic agent for many liquids, as an antiskid agent for paper or plastic, and as an "antiblocking" agent, for example, for polyethylene, whereby sheets of this plastic can no longer stick together. Another interesting application of the produced silicic acid is as an agent for the conversion of liquids into powders. Silicic acid can absorb, for example, up to 400% of its own weight of concentrated sulfuric acid without losing its powder form, while the characteristic sulfuric acid action is retained.

A number of illustrative examples of the process according to the invention are given below:

Example 1

In a rustfree tank of a capacity of 20 l. and provided with an agitator, 6000 g. of water are introduced and heated as quickly as possible to a temperature of 80° C.

While stirring intensively, there are proportioned simultaneously dilute waterglass solution (concentration: 10.1% $SiO_2$ and 3.06% $Na_2O$) at a rate of 58 g./minute and dilute sulfuric acid (concentration: 19% $H_2SO_4$) at a rate of 14 g./minute. P and Q are thus 0.12 and 10.24, respectively. During this addition the temperature is maintained at 80° C. and the pH is constant at 7.4. The addition is terminated after a total of 55 minutes. In the finely divided suspension thus obtained the $SiO_2$ concentratino is 3.3%.

Then the reaction mixture is poured into a dilute sulfuric acid solution so that the pH is rapidly lowered to 2.5. The finely divided silicic acid is filtered off and washed with water. Following this, the filter cake is dried on plates at a temperature of 140° C. for 15 hours. A finely divided silicic acid having a surface of 230 m.²/g. and an oil absorption of 2.3 cc./g. is obtained.

Examples 2 to 45

In the following Table I a number of variants of Example 1 are given. The examples are presented in groups carried out according to the same concentration build-up, but for various proportioning times. For greater clarity, Example 1 is also included. The examples are indicated also on FIGS. 3–6 and identified by the corresponding numbers of the examples as listed in Table I.

The silicic acids which have good reinforcement properties for rubber (surface 100–250 m.²/g., and oil absorption greater than 2.0 cc./g.) are marked with a plus sign in the last column of Table I, and it will be seen that these examples are all included within the ranges according to the invention.

TABLE I

| Ex. No. | T., °C | pH | V, gram | $F_w$, g./min. | $F_z$, g./min. | $C_w$, percent | $C_z$, percent | P | Q | t, min. | $C_s$, percent | SA, m.²/g. | OA, ml./g. | |
|---|---|---|---|---|---|---|---|---|---|---|---|---|---|---|
| 1 | 80 | 7.4 | 6,000 | 58 | 14 | 10.1 | 19 | 0.12 | 10 | 55 | 3.3 | 230 | 2.3 | + |
| 2 | 80 | 7.4 | 6,000 | 58 | 14 | 10.1 | 19 | 0.12 | 10 | 65 | 3.65 | 201 | 2.8 | + |
| 3 | 80 | 7.4 | 6,000 | 58 | 14 | 10.1 | 19 | 0.12 | 10 | 105 | 4.75 | 126 | 3.9 | − |
| 4 | 80 | 7.4 | 4,000 | 56 | 14 | 8.1 | 15 | 0.153 | 8.5 | 31 | 2.3 | 309 | 2.4 | − |
| 5 | 80 | 7.4 | 4,000 | 56 | 14 | 8.1 | 15 | 0.153 | 8.5 | 45 | 2.9 | 220 | 3.5 | + |
| 6 | 80 | 7.4 | 4,000 | 56 | 14 | 8.1 | 15 | 0.153 | 8.5 | 85 | 3.97 | 129 | 3.2 | − |
| 7 | 80 | 7.4 | 6,000 | 55 | 14 | 8.1 | 15 | 0.154 | 13 | 75 | 3.0 | 217 | 2.8 | + |
| 8 | 80 | 7.4 | 6,000 | 55 | 14 | 8.1 | 15 | 0.154 | 13 | 95 | 3.43 | 178 | 3.8 | + |
| 9 | 80 | 7.4 | 6,000 | 55 | 14 | 8.1 | 15 | 0.154 | 13 | 140 | 4.05 | 121 | 3.6 | − |
| 10 | 80 | 8.2 | 3,500 | 155 | 31 | 7.7 | 15 | 0.156 | 2.9 | 40 | 4.3 | 227 | 2.5 | + |
| 11 | 80 | 8.2 | 3,500 | 155 | 31 | 7.7 | 15 | 0.156 | 2.9 | 65 | 4.9 | 129 | 3.4 | − |
| 12 | 80 | 8.2 | 3,500 | 155 | 31 | 7.7 | 15 | 0.156 | 2.9 | 80 | 5.16 | 106 | 2.7 | − |
| 13 | 80 | 8.2 | 6,000 | 57 | 14 | 10.1 | 19 | 0.12 | 10 | 70 | 3.83 | 244 | 2.1 | + |
| 14 | 80 | 8.2 | 6,000 | 57 | 14 | 10.1 | 19 | 0.12 | 10 | 80 | 4.13 | 224 | 2.4 | + |
| 15 | 80 | 8.2 | 6,000 | 57 | 14 | 10.1 | 19 | 0.12 | 10 | 130 | 5.13 | 145 | 4.0 | − |
| 16 | 80 | 8.2 | 4,000 | 57 | 14 | 8.1 | 15 | 0.153 | 8.5 | 45 | 2.9 | 312 | 1.1 | − |
| 17 | 80 | 8.2 | 4,000 | 57 | 14 | 8.1 | 15 | 0.153 | 8.5 | 70 | 3.63 | 235 | 2.6 | + |
| 18 | 80 | 8.2 | 4,000 | 57 | 14 | 8.1 | 15 | 0.153 | 8.5 | 92 | 4.07 | 186 | 3.8 | + |
| 19 | 80 | 8.2 | 4,000 | 57 | 14 | 8.1 | 15 | 0.153 | 8.5 | 140 | 4.7 | 115 | 3.7 | − |
| 20 | 80 | 8.2 | 6,000 | 56 | 14 | 8.1 | 15 | 0.154 | 13 | 100 | 3.5 | 217 | 2.1 | + |
| 21 | 80 | 8.2 | 6,000 | 56 | 14 | 8.1 | 15 | 0.154 | 13 | 120 | 3.8 | 193 | 2.8 | + |
| 22 | 80 | 8.2 | 6,000 | 56 | 14 | 8.1 | 15 | 0.154 | 13 | 155 | 4.2 | 163 | 3.6 | + |
| 23 | 80 | 8.2 | 6,000 | 56 | 14 | 8.1 | 15 | 0.154 | 13 | 210 | 4.6 | 118 | 3.6 | − |
| 24 | 80 | 8.2 | 6,000 | 61 | 30 | 8.1 | 7.5 | 0.183 | 12.2 | 130 | 3.6 | 186 | 3.0 | + |
| 25 | 80 | 8.2 | 6,000 | 61 | 30 | 8.1 | 7.5 | 0.183 | 12.2 | 160 | 2.86 | 161 | 4.3 | + |
| 26 | 80 | 8.2 | 6,000 | 61 | 30 | 8.1 | 7.5 | 0.183 | 12.2 | 240 | 4.2 | 108 | 4.1 | − |
| 27 | 80 | 9.0 | 6,000 | 89 | 65 | 8.1 | 5 | 0.214 | 8.3 | 108 | 3.43 | 187 | 2.4 | + |
| 28 | 80 | 9.0 | 4,000 | 59 | 14 | 8.1 | 15 | 0.153 | 8.5 | 55 | 3.2 | 338 | 1.0 | − |
| 29 | 80 | 9.0 | 4,000 | 59 | 14 | 8.1 | 15 | 0.153 | 8.5 | 100 | 4.2 | 231 | 2.8 | + |
| 30 | 80 | 9.0 | 4,000 | 59 | 14 | 8.1 | 15 | 0.153 | 8.5 | 136 | 4.67 | 174 | 3.9 | + |
| 31 | 80 | 9.0 | 5,000 | 143 | 67.0 | 8.1 | 7.5 | 0.181 | 4.3 | 50 | 3.76 | 326 | 1.2 | − |
| 32 | 80 | 9.0 | 5,000 | 143 | 67 | 8.1 | 7.5 | 0.181 | 4.3 | 90 | 4.3 | 219 | 3.6 | + |
| 33 | 80 | 9.0 | 6,000 | 58 | 14 | 8.1 | 15 | 0.154 | 13 | 90 | 3.33 | 296 | 1.4 | − |
| 34 | 80 | 9.0 | 6,000 | 58 | 14 | 8.1 | 15 | 0.154 | 13 | 150 | 4.16 | 226 | 3.3 | + |
| 35 | 80 | 9.0 | 6,000 | 58 | 14 | 8.1 | 15 | 0.154 | 13 | 210 | 4.65 | 178 | 3.9 | + |
| 36 | 70 | 8.2 | 4,000 | 57 | 14 | 8.1 | 15 | 0.153 | 8.5 | 55 | 2.85 | 362 | 1.7 | − |
| 37 | 70 | 8.2 | 4,000 | 57 | 14 | 8.1 | 15 | 0.153 | 8.5 | 70 | 3.67 | 283 | 2.3 | − |
| 38 | 70 | 8.2 | 4,000 | 57 | 14 | 8.1 | 15 | 0.153 | 8.5 | 105 | 4.25 | 205 | 3.8 | + |
| 39 | 70 | 8.2 | 4,000 | 57 | 14 | 8.1 | 15 | 0.153 | 8.5 | 140 | 4.67 | 166 | 4.0 | + |
| 40 | 75 | 8.2 | 4,000 | 57 | 14 | 8.1 | 15 | 0.153 | 8.5 | 60 | 3.36 | 297 | 2.1 | − |
| 41 | 75 | 8.2 | 4,000 | 57 | 41 | 8.1 | 15 | 0.153 | 8.5 | 80 | 3.83 | 239 | 2.7 | + |
| 42 | 75 | 8.2 | 4,000 | 57 | 14 | 8.1 | 15 | 0.153 | 8.5 | 129 | 4.57 | 155 | 4.4 | + |
| 43 | 85 | 8.2 | 4,000 | 57 | 14 | 8.1 | 15 | 0.153 | 8.5 | 60 | 3.35 | 206 | 2.5 | + |
| 44 | 85 | 8.2 | 4,000 | 57 | 14 | 8.1 | 15 | 0.153 | 8.5 | 80 | 3.83 | 161 | 2.4 | + |
| 45 | 85 | 8.2 | 4,000 | 57 | 14 | 8.1 | 15 | 0.153 | 8.5 | 118 | 4.43 | 116 | 4.6 | − |

In the above Table I, the values given under the column headed SA are of surface area measured by the method of Brunauer, Emmett and Teller; and the values given under the column headed OA are of oil absorption determined by the "Modified Gardner-Coleman Oil Absorption Test."

Example 46

In a tank of stainless steel provided with an agitator and having a capacity of 1 m.³ there are introduced 135 kg. of water of 80° C. During intensive agitation there are simultaneously introduced, approximately at the same point, dilute waterglass (concentration 9% $SiO_2$ and 2.72% $Na_2O$) at a rate of 15 kg./minute and dilute sulfuric acid (concentration 15% $H_2SO_4$) at a rate of 4.125 kg./minute.

During this simultaneous addition, a temperature of 80° C. is maintained and the pH is held at a constant value of 8.2. After 15 minutes the addition is terminated. In the finely divided suspension obtained in this manner the $SiO_2$ concentration is 4.36%. Then the reaction mixture is brought to a pH of 4 as quickly as possible with dilute sulfuric acid. The finely divided silicic acid is filtered and washed with water. The resulting filter cake is well homogenized in a grinding device and then dried in an atomization dryer at a spray pressure of 100 atm., an entrance temperature of 500° C., and an exit temperature of 125° C.

A finely divided silicic acid having a surface of 293 m.²/g. and an oil absorption of 3.5 cc./g. is obtained.

The silicic acid is mixed into a so-called transparent rubber mixture on a rubber roller. The silicic acid-rubber mixture has the following composition:

| | Parts (by weight) |
|---|---|
| Styrene-butadiene rubber No. 1502 | 100 |
| Active zinc oxide | 2 |
| Stearic acid | 2 |
| Triethylamine | 0.5 |
| Mercaptobenzimidazol | 1 |
| Diphenyl guanidine | 1.2 |
| Di-2-benzothiazyl disulfide | 0.8 |
| Ethylene glycol | 3.0 |
| Sulfur | 2.5 |
| Silicic acid | 50 |

24 hours after the admixture of the silicic acid and rubber, the mixture is vulcanized at 150° C. The properties of the rubber platelets obtained in this manner are as follows:

| | |
|---|---|
| Mooney plasticity (non-vulcanized mixture) | 192 |
| Scorch time (minutes) (non-vulcanized mixture) | 4.5 |
| Hardness ° Shore | 76 |
| Modulus 300 kg./cm.² | 65 |
| Drawing strength kg./cm.² | 250 |
| Elongation at rupture, percent | 620 |
| Tensile strength kg./cm.² | 46 |
| Wear, mm.³ | 145 |
| Transparence | Very good |
| Total impression | Negative |

In the following Table II are given the pertinent values for a number of variants of Example 46, and for Example 46 itself which is there identified as No. 47. Those examples which are carried out according to the same concentration build-up are arranged in groups on Table II and all of Examples 47 to 58 are plotted as points on FIG. 5b which are identified by corresponding numerals. The acids which have good reinforcement properties for rubber are marked with a plus sign in the last column of Table II, and are shown on FIG. 5b to be within the ranges according to the invention.

TABLE II

| Ex. No. | T, °C. | pH | V, kg. | $F_w$, kg./min. | $F_z$, kg./min. | $C_w$, Percent | $C_z$, Percent | P | Q | t, min. | $C_s$, Percent | SA, m.²/g. | OA ml./g |
|---|---|---|---|---|---|---|---|---|---|---|---|---|---|
| 47 | 80 | 8.2 | 135 | 15 | 4.125 | 9 | 15 | 0.156 | 1 | 15 | 4.36 | 293 | 3.5 |
| 48 | 80 | 8.2 | 135 | 15 | 4.125 | 9 | 15 | 0.156 | 1 | 30 | 5.12 | 185 | 2.4 |
| 49 | 80 | 8.2 | 135 | 3 | 0.825 | 9 | 15 | 0.156 | 5 | 50 | 3.9 | 173 | 3.2 |
| 50 | 80 | 8.2 | 135 | 3 | 0.825 | 9 | 15 | 0.156 | 5 | 60 | 4.16 | 175 | 3.8 |
| 51 | 80 | 8.2 | 135 | 3 | 0.825 | 9 | 15 | 0.156 | 5 | 120 | 5.03 | 89 | 3.2 |
| 52 | 80 | 8.2 | 270 | 3 | 0.825 | 9 | 15 | 0.156 | 10 | 80 | 3.53 | 159 | 2.7 |
| 53 | 80 | 8.2 | 270 | 3 | 0.825 | 9 | 15 | 0.156 | 10 | 100 | 3.9 | 148 | 3.0 |
| 54 | 80 | 8.2 | 270 | 3 | 0.825 | 9 | 15 | 0.156 | 10 | 160 | 4.57 | 79 | 3.5 |
| 55 | 80 | 8.2 | 270 | 15 | 0.413 | 9 | 15 | 0.156 | 20 | 140 | 3.33 | 122 | 2.1 |
| 56 | 80 | 8.2 | 270 | 15 | 0.413 | 9 | 15 | 0.156 | 20 | 160 | 3.53 | 108 | 2.5 |
| 57 | 80 | 8.2 | 270 | 15 | 0.413 | 9 | 15 | 0.156 | 20 | 200 | 3.9 | 86 | 2.3 |
| 58 | 80 | 8.2 | 270 | 15 | 0.413 | 9 | 15 | 0.156 | 20 | 240 | 4.16 | 93 | 3.7 |

| | Rubber Properties | | | | | | | | | |
|---|---|---|---|---|---|---|---|---|---|---|
| Ex. No. | I | II | III | IV | V | VI | VII | VIII | IX | X |
| 47 | 192 | 4.5 | 76 | 65 | 250 | 620 | 46 | 145 | s.g. | − |
| 48 | 101 | 3.8 | 67 | 63 | 130 | 535 | 39 | 215 | s. | − |
| 49 | 129 | 4.2 | 72 | 39 | 200 | 615 | 45 | 165 | g. | + |
| 50 | 127 | 4.1 | 75 | 46 | 220 | 605 | 48 | 155 | s.g. | + |
| 51 | 84 | 3.9 | 67 | 58 | 160 | 520 | 33 | 190 | s. | − |
| 52 | 110 | 3.9 | 74 | 32 | 210 | 655 | 50 | 175 | g. | + |
| 53 | 109 | 3.8 | 73 | 35 | 210 | 640 | 47 | 170 | g. | + |
| 54 | 79 | 3.6 | 69 | 43 | 190 | 595 | 39 | 185 | s. | − |
| 55 | 88 | 3.7 | 70 | 28 | 190 | 640 | 43 | 185 | m. | − |
| 56 | 77 | 3.8 | 67 | 26 | 175 | 645 | 37 | 195 | m. | − |
| 57 | 75 | 3.7 | 66 | 30 | 180 | 630 | 35 | 195 | s. | − |
| 58 | 79 | 3.8 | 67 | 37 | 185 | 605 | 38 | 185 | s. | − |

In the portion of the above Table II relating to Rubber Properties, the column headings have the following meanings:

I—Mooney plasticity
II—Scorch time (minutes)
III—Hardness, ° Shore
IV—Modulus 300 kg./cm.²
V—Drawing strength kg./cm.²
VI—Elongation at rupture, percent
VII—Tensile strength kg./cm.²
VIII—Wear mm.³
IX—Transparency (visual)
X—Total impression Although specific embodiments of the invention have been described in detail herein, it is to be understood that the invention is not limited to those precise embodiments, and that various changes and modifications may be effected therein by one skilled in the art without departing from the scope of the invention as defined in the appended claims.

What is claimed is:

1. The process for the production of finely divided silicic acid by simultaneously adding solutions of an alkali silicate and a strong mineral acid to a quantity of an aqueous liquid at a temperature between 70° C. and 90° C., acidifying the reaction mixture after completion of the addition of said solutions, and then successively separating, washing and drying the silicic acid formed; wherein said aqueous liquid is water, during the addition of said solutions of alkali silicate and strong mineral acid to the water a pH in the range of 7 and 9 is maintained, and the addition of said solutions to the water is continued until a time when the concentration of $SiO_2$ in the reaction mixture has attained a value which is in the range between 2.5% and 5.0%, by weight, and which, is as a function of the pH and temperature of the reaction mixture, corresponds to a point within three-dimensional figure number 7 in which X, Y and Z are orthogonal coordinates along which there are respectively plotted values of pH of the reaction mixture, the concentration of $SiO_2$ in the reaction mixture, in percent, by weight, and the temperature of the reaction mixture in degrees centigrade.

2. The process according to claim 1; wherein said process is conducted in accordance with the formula:

$$C_s = \frac{t}{Pt+Q}$$

in which $C_s$ is the $SiO_2$ concentration in percent, by weight, in the reaction mixture, $t$ is the time, in minutes, during which said solutions of alkali silicate and strong mineral acid have been simultaneously added to the water, P is the rate of weight increase of the reaction mixture, in grams per minute, over 100 times the rate at which $SiO_2$ is proportioned, in grams per minute, and Q is the quantity of water, in grams, over 100 times said rate at which $SiO_2$ is proportioned, in grams per minute, and in which P and Q respectively have values in the ranges between 0.05 and .25 and between 2 and 20.

3. The process according to claim 1; wherein the temperature of said reaction mixture is maintained at approximately 80° C., and the addition of said solutions of alkali silicate and strong mineral acid to said water is continued for a time which, in connection with the pH and temperature of the reaction mixture correspond to a point within three-dimensional figure number 1.

4. The process according to claim 1; wherein the temperature of the reaction mixture is maintained at about 80° C., and the addition of said solutions of alkali silicate and strong mineral acid to the water is continued for a time in the range between 6 and 270 minutes.

5. The process according to claim 4; wherein the pH of the reaction mixture is maintained at 8.2 and the addition of said solutions of alkali silicate and strong mineral acid to said water is continued for a time within the range between about 15 and 230 minutes so as to attain a final concentration of $SiO_2$ in the reaction mixture of from about 3.4% to 4.4%, by weight.

6. The process according to claim 1; wherein said acidifying of the reaction mixture reduces the pH of the latter to below 4.0.

7. The process according to claim 6; wherein said acidifying of the reaction mixture is effected by pouring the latter into a quantity of acid with intensive agitation.

8. The process according to claim 1; wherein said washing of the silicic acid formed is continued until the $Na_2O$ content thereof is less than 1%, by weight.

9. The process according to claim 1; wherein said drying of the silicic acid formed is effected on plates at a temperature of 130° C. to 150° C. for a period of 10 to 20 hours.

10. The process according to claim 1; wherein said drying of the silicic acid formed is effected in an atomization dryer.

References Cited

UNITED STATES PATENTS 2,940,830 6/1960 Thornhill _____ 23—182
3,235,331 2/1966 Nauroth et al. _____ 23—182

FOREIGN PATENTS 1,168,874 4/1964 Germany.

OSCAR R. VERTIZ, *Primary Examiner.*

ARTHUR GREIF, *Assistant Examiner.*

U.S. Cl. X.R.

106—309